Aug. 29, 1939.  J. C. OLSEN  2,170,973
BELT FASTENER
Filed Feb. 14, 1938
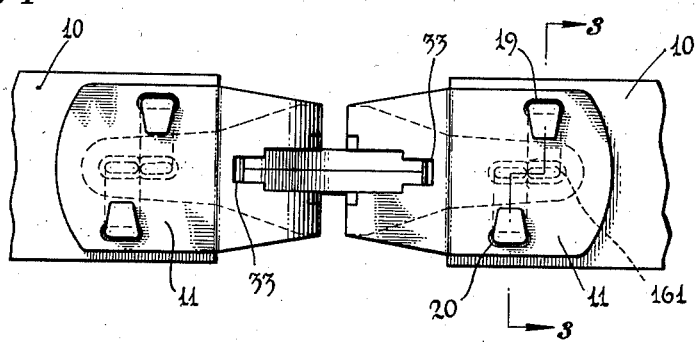
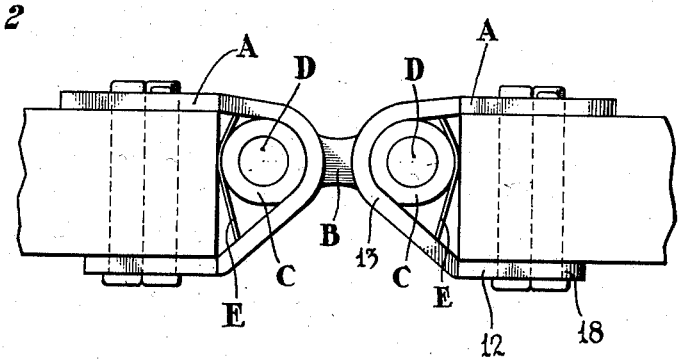
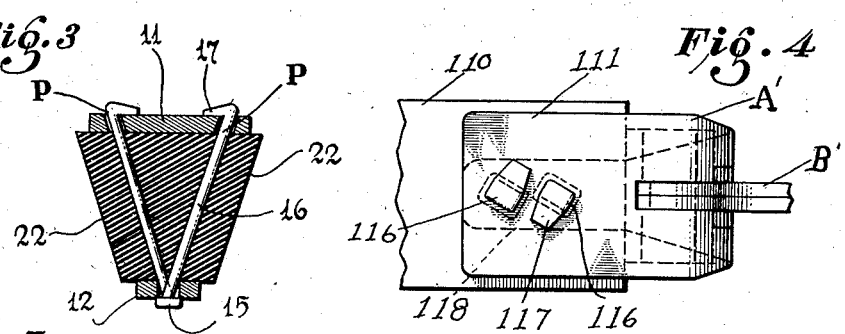
INVENTOR
John C. Olsen
BY Joseph Harris
his ATTORNEY Patented Aug. 29, 1939

2,170,973

UNITED STATES PATENT OFFICE 2,170,973

BELT FASTENER

John C. Olsen, Chicago, Ill., assignor to Flexible Steel Lacing Company, Chicago, Ill., a corporation of Illinois Application February 14, 1938, Serial No. 190,399

1 Claim. (Cl. 24—33)

This invention relates to improvements in belt fastener and, more specifically, means for securing the attaching members proper of V-belt fasteners to the ends of V-belts.

The securing of belt fasteners, particularly of the flexible or hinged type, to the ends of V-belts is beset with many practical limitations, as is well known. In order to avoid unduly lengthy "rigid" sections in the belt, which would cause excessively rapid deterioration of the belt and fastener from "whipping", it is necessary that the securing pins, nails, bolts or other corresponding elements, be located as near the free ends of the belt as possible. Also, care must be exercised to prevent side or transverse "swelling" of the belt adjacent securing elements, particularly in the smaller size or narrow V-belts, since such swelling or deformation of the belt would cause excessively rapid wear of the belt material and premature pulling out of the fastener.

As also well known, in the case of the usual narrow V or side driving belts, say approximately ⅞", the use of a single pin, bolt or nail extending radially through the belt material and the belt-embracing portions of the fastener attaching member (usually of bail formation) does not generally provide the necessary or desirable amount of securing or holding strength for the fasteners and consequently various expedients have heretofore been employed to augment or increase the strength of the securing or holding arrangement. One such expedient is to employ a number of brads driven through one arm of the attaching member into the belt material. This expedient, however, has the disadvantage that the brads "work-harden" or crystallize and break off, thus losing that corresponding amount of the holding strength. Another expedient, is to employ two round bolts for the attaching member, the bolts being arranged in tandem circumferentially of the belt. Experience has demonstrated that this arrangement affords practically no substantial increase in the securing or holding strength due, probably to the fact that such arrangement does not provide resistance in the belt material in the line of pull additional to that of one bolt.

One object of the invention, therefore, is to provide a simple, compact, and exceptionally strong securing or holding arrangement for the attaching members of a belt fastener and, more especially, for narrow or small size V or side driving belts.

Another object of the invention is to provide a multiple, specialized shape nail or pin securing or holding arrangement for the attaching members of belt fasteners for small size V-belts, which arrangement is characterized by the fact that all of said nails or pins may be entered through a relatively narrow member on the inner side of the belt and so disposed that no appreciable swelling of the belt is produced while, at the same time, a more effective attachment is obtained than by the common tandem bolt arrangements heretofore employed.

More specifically, an object of the invention is to provide a V or side driving belt end fastener securing or holding arrangement wherein each attaching member proper is secured to its respective belt end by means of a plurality of securing pins or nails extending completely through the belt material and so disposed with reference to the belt material that the securing pins or nails are offset lengthwise of the belt and also offset, either in their entirety or in part, transversely of the belt.

Other objects of the invention will more clearly appear from the description and claim hereinafter following taken in connection with the drawing.

In the drawing forming a part of this specification, Figure 1 is a top plan view of the adjacent ends of a V or side driving belt showing one embodiment of the present invention incorporated therein. Figure 2 is a side elevation of the structure shown in Figure 1. Figure 3 is a vertical transverse sectional view corresponding to the broken line 3—3 of Figure 1. And Figures 4 and 5 are top plan views illustrating two other embodiments of the invention.

In said drawing, and referring first to the form of the invention illustrated in Figures 1, 2 and 3, 10—10 indicate the ends of a side driving or V-belt of small or narrow size. A size found in common use is that of approximately ⅞" in connection with which the present invention is particularly adapted. In the case of such relatively narrow V-belts, it is highly important that the inner face of the V-belt be kept quite narrow in order that a maximum width be retained for the side or driving surfaces of the belt which engage the sides of the usual V grooves of the pulleys. Hence, as will be obvious to those skilled in the art, while it would be theoretically possible to reduce the radial thickness of the V-belt so as to obtain a wider inner face, practically, this is not feasible because of the resulting loss of driving power due to the reduced width of the side driving faces.

In said Figures 1, 2 and 3 of the drawing has been illustrated a hinged or flexible type of fastener comprised, broadly, of two attaching members proper A—A; a link connecting means B; bearing members C—C; hinge pins D—D; and assembly maintaining spring plates E—E.

Each of the attaching members A, as shown, is in the form of a bail with an upper or outer relatively wide arm 11, a lower or inner narrower arm 12, and a connecting bight 13 tapering in width from that of the outer arm 11 to that of the inner arm 12, as best indicated in Figure 1. The two arms 11 and 12 overlap or embrace the outer and inner faces respectively of the belt for a suitable distance and are secured to the belt end by means described more in detail hereinafter.

The bight sections 13 of the attaching members are apertured for the reception therethrough of the link connecting means B and through the apertured ends of the latter are extended preferably rocker hinge pins D. The latter in turn are seated in the bearing members C—C which are received in the apices of the bights of the attaching members, as will be evident from inspection of Figure 2. The parts of the fastener proper, so far described, are adapted to be maintained in assembled condition by the spring plates E which engage behind the ends of the links, said spring plates having their upper and lower ends received in notches 33—33 of the attaching members A—A, as shown.

The arrangement of flexible connection between the attaching members may be of any suitable type as will be understood by those skilled in the art.

Referring now more particularly to the means and manner of securing the attaching members to the respective belt ends. As shown, each attaching member A is secured to its respective belt end by two securing pins or elements P—P. Each of the pins or elements P is provided with a head as indicated at 15, preferably at its inner end, a shank 16 and a preferably tapered bendable outer tang end 17. As clearly shown in the drawing, the shanks of the pins P are approximately rectangular in cross section with the narrow sides or edges thereof preferably rounded as indicated by dotted lines at 16l in Figure 1. In the particular embodiment of the invention shown in Figures 1, 2 and 3, the shanks of the pins P are so arranged that the longer dimension of the cross section of the shanks extend lengthwise of or parallel to the line of travel of the belt and the narrower dimension of the cross section of the shanks, transversely of the belt.

The pins are passed through preferably a single relatively elongated opening 18 in the lower arm 12 of the attaching member A, said opening 18 being disposed substantially medially, transversely, of the arm 12 and of such length and width as to receive the two pin shanks snugly in tandem arrangement at their head ends. It is not essential for the carrying out of the present invention, that the two head ends of the pins P be entered through a single opening 18, since two slightly longitudinally spaced openings might be employed, as will be apparent, without departing from the spirit of the invention. The bendable tang ends of the pins are entered through two apertures 19 and 20 in the outer arm 11 of the attaching member, said apertures 19 and 20 being obviously laterally or transversely spaced to points closely adjacent the side edges of the arm 11, as best shown in Figures 1 and 3. Said apertures 19 and 20 are also longitudinally offset corresponding to the edge to edge positioning of the pin shanks. From Figure 3, it will further be observed that the shanks of the pin P extend substantially parallel to the side driving faces 22—22 of the belt, although it will be understood that the particular angle of inclination of the pins P may be varied. When applying the securing or holding pins P, the belt material will preferably be pierced by an awl prior to the insertion of the pins through the material and their ends 17 clinched over, as will be understood.

With the construction and arrangement of securing pins P, as shown and described, it will be observed that side swelling of the belt material is eliminated, or substantially so, since the pins P, per se, are relatively thin, transversely of the belt, and, being circumferentially offset, any slight swelling as each pin may individually produce, is not cumulated. Furthermore, the shanks of both of the pins of each set are each independently restrained against pulling out in the direction of the pull by material of the belt located between each respective pin and the end proper of the belt, thus accumulating the holding strength of the two pins. Referring to Figure 3, it will also be seen that, due to the divergent positioning of the two pins paralleling the surfaces of the side driving faces 22, a somewhat greater length of shank is embedded in the belt material than if the pin were extended strictly radially through the belt, thus providing additional resistance for each pin against pulling out under load.

The several factors above enumerated in connection with the construction and arrangement of the securing pins, all contribute to produce a practical and a substantially stronger securing or holding means for the belt fastener with longer life than those heretofore proposed and used. Obviously, also the present improvements may be concentrated near the end of the belt so as to avoid undue lengthy "rigid" sections in the belt; the desired radial thickness of the belt material with its narrow inner face may be retained without necessitating a widening of the inner arm of the attaching member; and the securing pins are obviously easy of application without necessitating any expensive preparation of the belt ends.

Referring next to the form of the invention illustrated in Figure 4, the attaching member A', link B' and pivotal connection between the link and the attaching member are or may be the same as shown and described in connection with the form of the invention illustrated in Figures 1, 2 and 3. In the Figure 4 form, while two securing pins 116—116 are employed, each of the same construction as the securing pins P of the first described form, their arrangement is somewhat different with reference to the attaching member A' and belt end 110. Each of said pins 116 is entered from the lower arm 118 of the attaching member radially through the belt and then through the upper arm 111 of the attaching member. Said pins 16 are, however, so disposed that the longer dimensions of the shanks thereof are extended diagonally of the belt and the arms of the attaching member, as clearly shown in the elevational view of Figure 4, said pins, of course, being also offset or separated circumferentially of the belt. The tangs 117 of the two pins will preferably be bent over in opposite directions, as shown in Figure 4.

With this arrangement, any appreciable swelling laterally of the belt proper is avoided, and, at the same time, a greater resistance to pulling out is obtained, due to the diagonal disposition of the shanks, than would be obtained if the pins were positioned strictly tandem with the longer dimensions of the shanks extended parallel to the belt.

In the Figure 5 form of the invention, the attaching member A″, link B″ and pivotal connection therebetween are or may be the same as in the previously described forms. In the Figure 5 arrangement, three securing rails or pins 216, 316 and 416 are employed, each of which is arranged radially of the belt. Said three pins however are not only circumferentially offset or separated, as clearly shown in Figure 5, but are alternately transversely offset or staggered with respect to each other, as shown. As in the first described form, the longer dimensions of the cross sections of the pin shanks are extended parallel to the length of the belt, thereby avoiding undue swelling of the belt while, at the same time, the attaching strength is increased particularly because of the transversely staggered relation and the comparatively great distance between those two pins 216 and 416, which are in line with each other. Preferably, as shown, the end tangs 217 of alternate pins are bent in opposite directions. With the arrangement just described, it is evident that the strength of the attaching member is not militated against, particularly the inner narrow arm thereof, since the apertures therein for the pins are staggered. Furthermore, because no two of the plurality of pins are in line with each other transversely of the belt, lateral swelling of the belt is maintained at a minimum and at no point in excess of that which would be produced by a single pin of the same construction and size. It will also be evident that the resistance to pulling out of the securing pins is not less than twice that which would obtain if only a single securing pin were employed for the reason that the securing pins are laterally offset, thus presenting more material of the belt between the forward edges of the securing pins and the end of the belt proper.

Although there has herein been shown and described what is now considered the preferred manner of carrying out the invention, the same is merely illustrative, and all changes and modifications are contemplated that come within the scope of the claim appended hereto.

What is claimed is:

In a device of the character described, the combination with an attaching member, of a fastener for a side driving belt of relatively narrow width, said attaching member having united outer and inner arms adapted to embrace, respectively, the outer and inner faces of the end of such a narrow belt, said outer arm being wider than the inner arm and the latter narrower than the inner face of the belt and both arms of the attaching member being provided with three sets of pairs of apertures, the apertures of each pair being alined radially of the belt, the respective pairs of said apertures being spaced from each other in a direction lengthwise of the attaching member and also alternately offset from each other transversely of the attaching member; of three securing elements each of which is extended radially through an alined pair of said apertures, each said element having a shank of substantially rectangular cross section relatively elongated in a direction parallel to the line of the belt to which the attaching member is adapted to be secured and relatively narrow in a direction transversely of the belt, whereby the strength of the attaching member is maintained in the inner narrow arm thereof, lateral swelling of the belt is kept to a minimum corresponding to that produced by one said element only and the effective amount of belt material to resist endwise pulling out of said three elements is not less than twice that effective to resist endwise pulling out of one such element.

JOHN C. OLSEN.